(12) United States Patent
Sethapun et al.

(10) Patent No.: US 11,503,921 B2
(45) Date of Patent: Nov. 22, 2022

(54) APPARATUS FOR MATTRESS RETENTION IN AN AIRCRAFT PASSENGER COMPARTMENT

(71) Applicant: Gulfstream Aerospace Corporation, Savannah, GA (US)

(72) Inventors: Kevin Sethapun, Savannah, GA (US); Terry Baker, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 259 days.

(21) Appl. No.: 16/946,243

(22) Filed: Jun. 11, 2020

(65) Prior Publication Data

US 2021/0386212 A1 Dec. 16, 2021

(51) Int. Cl.
| | |
|---|---|
| *A47C 31/00* | (2006.01) |
| *B64D 11/06* | (2006.01) |
| *A47C 21/02* | (2006.01) |
| *A47C 27/00* | (2006.01) |
| *B64D 11/00* | (2006.01) |

(52) U.S. Cl.
CPC ............ *A47C 31/00* (2013.01); *A47C 21/026* (2013.01); *A47C 27/002* (2013.01); *B64D 11/0604* (2014.12); *B64D 11/0696* (2013.01); *B64D 2011/0069* (2013.01)

(58) Field of Classification Search
CPC ..... A47C 31/00; A47C 21/026; A47C 27/002; B64D 11/00; B64D 11/0604; B64D 11/0696; B64D 2011/0069
See application file for complete search history.

(56) References Cited

U.S. PATENT DOCUMENTS

| | | | |
|---|---|---|---|
| 2010/0050339 A1* | 3/2010 | Beard | A47C 21/026 5/411 |
| 2015/0196147 A1* | 7/2015 | Jensen | A47G 9/04 5/498 |
| 2019/0344894 A1* | 11/2019 | Bang | A61G 7/015 |

* cited by examiner

*Primary Examiner* — Fredrick C Conley
(74) *Attorney, Agent, or Firm* — LKGlobal | Lorenz & Kopf, LLP

(57) ABSTRACT

The present application relates to securing a mattress within an aircraft including a pliable enclosure configured for enclosing a cushion including a fastener system for providing access to an interior of the pliable enclosure when the fastener system is in an open state and for restraining the mattress when the fastener system is in a closed state and wherein the pliable enclosure has a top surface and a bottom surface and a strapping system affixed to the bottom surface wherein the strapping system includes a strap extension affixed to the strapping system wherein the strap extension is configured to be received by a retention clip secured to a bed support platform.

18 Claims, 4 Drawing Sheets

APPARATUS FOR MATTRESS RETENTION IN AN AIRCRAFT PASSENGER COMPARTMENT

BACKGROUND

The present disclosure relates generally to fixtures within an aircraft passenger compartment. More specifically, aspects of this disclosure relate to systems, methods and devices for securing a mattress or seating surface cushion within an aircraft passenger.

Some aircraft provide beds for passengers where the beds include mattresses which are typically placed on a platform or podium to raise the mattress to a comfortable level above the aircraft floor. For occupant safety during flight, the mattress must be secured to the bed platform. Typically, the mattress is secured to the bed platform by one or more straps which wrap around the mattress and are secured to the bed platform. When tightened, these straps may deform the mattress in a way that is uncomfortable to an occupant lying on the mattress. In addition, the straps themselves may cause discomfort to the occupant. In some instances, to avoid these discomforts, occupants may remove the straps thereby leaving the mattress unsecured and creating a potential safety hazard for the aircraft occupants. It would be desirable to secure the mattress to the bed platform in a manner which overcomes the aforementioned problems to increase occupant comfort while ensuring adequate occupant safety.

The above information disclosed in this background section is only for enhancement of understanding of the background of the invention and therefore it may contain information that does not form the prior art that is already known in this country to a person of ordinary skill in the art.

SUMMARY

Disclosed herein are fixtures, devices and systems for providing a mattress and bed support and attachment of the mattress to the bed support to provide restriction of movement of the mattress within an aircraft passenger compartment, methods for making and methods for operating such systems, and vehicles equipped with such systems. By way of example, and not limitation, there is presented a pliable enclosure for enclosing a mattress including a strapping system affixed to a bottom side of the pliable closure configured to be received by a plurality of retention clips attached to a bed support structure.

In accordance with a non-limiting embodiment of the present disclosure, an apparatus including, but not limited to, a pliable enclosure configured for enclosing a cushion including a fastener system for providing access to an interior of the pliable enclosure when the fastener system is in an open state and for restraining the mattress when the fastener system is in a closed state and wherein the pliable enclosure has a top surface and a bottom surface and a strapping system affixed to the bottom surface wherein the strapping system includes a strap extension affixed to the strapping system wherein the strap extension is configured to be received by a retention clip secured to a bed support platform.

In accordance with another aspect of the present disclosure, a method for securing a mattress within an aircraft passenger compartment including opening the pliable enclosure by manipulating a fastener such that it is in the open state wherein the pliable enclosure is configured for enclosing the mattress having the fastener for providing access to an interior of the pliable enclosure when the fastener is in an open state and for restraining the mattress when the fastener is in a closed state, wherein the pliable enclosure has a top surface and a bottom surface and a strapping system affixed to the bottom surface wherein the strapping system includes a strap extension affixed to the strapping system and wherein the strap extension is configured to be received by a retention clip secured to a bed support platform, inserting the mattress within the pliable enclosure, closing the pliable enclosure by manipulating the fastener such that it is in the closed state, and securing the strapping system to the retention clip.

In accordance with another aspect of the present disclosure, an apparatus for securing a mattress to a bed support platform within an aircraft occupant compartment including an enclosure configured to enclose the mattress including a fastener system for providing access to an interior of the enclosure when the fastener is in an open state for restraining the mattress when the closure is in a closed state, wherein the pliable enclosure has a top surface and a bottom surface, a strapping system affixed to the bottom surface wherein the strapping system includes a strap extension affixed to the strapping system, and a retention clip secured to the bed support platform configured receive the strap extension.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
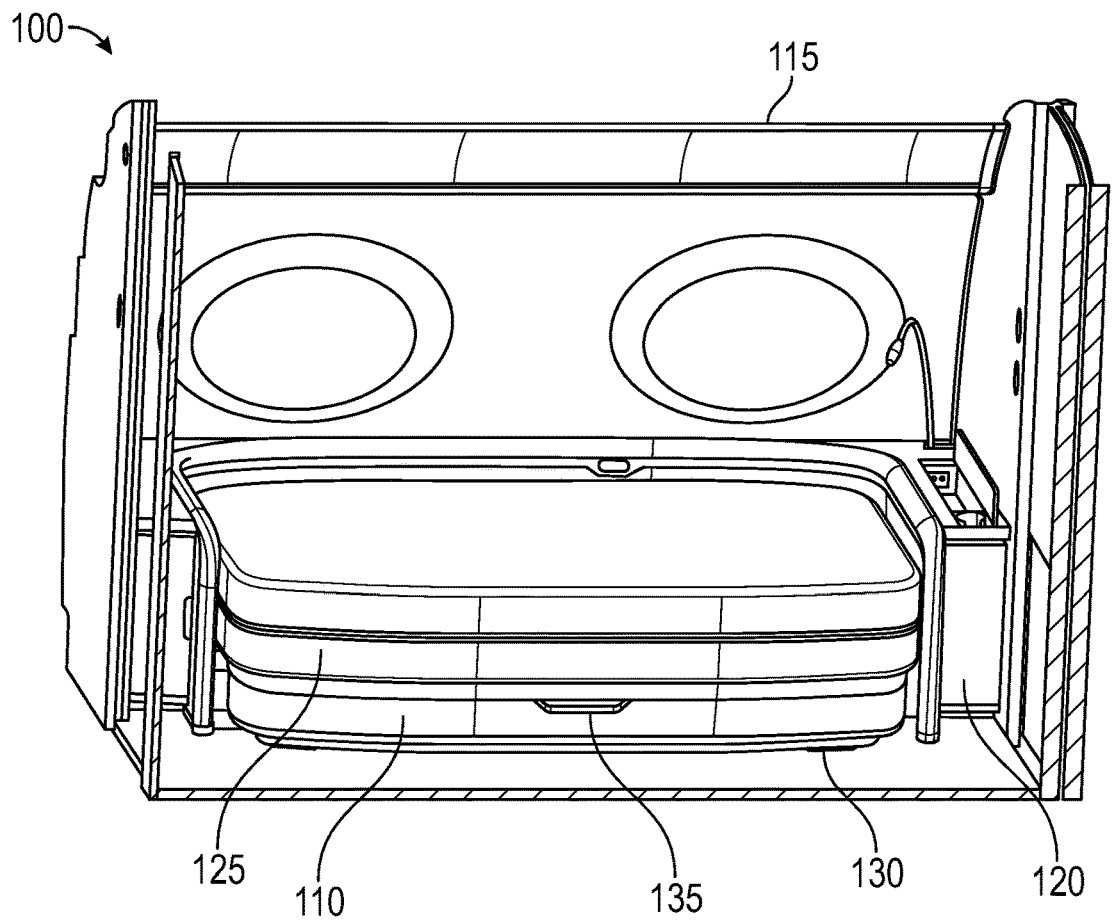
FIG. 1 is a perspective view illustrating an exemplary operating environment for providing a mattress retention system in an aircraft passenger compartment according to an exemplary embodiment.

FIG. 1 schematically illustrates an exemplary operating environment 100 for providing a mattress retention system in an aircraft passenger compartment according to an exemplary embodiment of the present disclosure. The exemplary operating environment 100 depicts a bed platform 110 including an interior storage volume positioned within a surround fixture 120 wherein the surround fixture 120 may further include additional storage compartments, electrical outlets or interfaces, lighting devices and the like. The bed platform 110 is operative for supporting a mattress 125. In this exemplary embodiment, the surround fixture 120 may be mounted proximate to an aircraft passenger compartment wall 115. Further, the storage platform 110 may be mounted to an aircraft passenger compartment floor 130 using station fittings that are engaged into seat tracks that are fastened to an aircraft passenger compartment floor 130. In one exemplary embodiment, the seat tracks run the length of the passenger compartment from the front to the back of the compartment and are typically used to fasten passenger seats into the aircraft. In some aircraft configurations, these seat tracks may be used to fasten other aircraft furniture, such as tables, couches, storage compartments, chairs, and the like. Some aircraft furniture, such as cabinets and storage compartments may be fastened to the seat tracks using station fittings which have a mechanism on one end to engage the seat track and a second mechanism on the opposite end to engage the aircraft furniture. In one exemplary embodiment, these station fittings may resemble furniture legs with the mechanism to engage the seat track at the bottom of the leg and the mechanism to engage the furniture, such as a bolt flange or template, on the top of the leg.

The bed platform 110 may further include a latching assembly 135 for providing access the interior storage. In one exemplary embodiment, the latching assembly 135 may include a paddle like lever for activating the latching assembly 135. For example, pushing up on the lever may allow an upper portion of the bed platform 120 to be lifted along with the mattress 125 to allow access to the interior storage volume. Pushing down on the lever may allow the upper portion of the bed platform 120 to be lowered to close the interior volume. Opening the bed platform 110 to gain access to the interior volume may further allow access to one or more retention clips under the upper portion of the bed platform for securing the mattress 125 to the bed platform.

Figure 2:
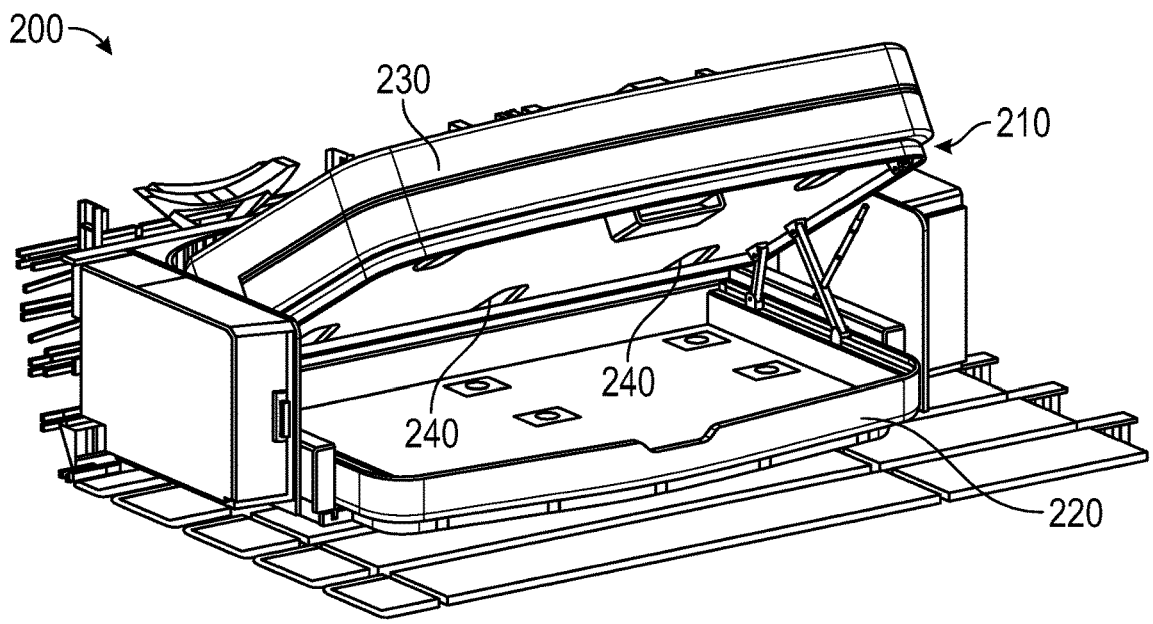
FIG. 2 is a perspective view illustrating an exemplary apparatus for providing a mattress retention system in an aircraft passenger compartment according to an exemplary embodiment.

Turning now to FIG. 2, an exemplary bed platform 200 for providing a mattress retention system in an aircraft passenger compartment according to an exemplary embodiment of the present disclosure is shown. In this exemplary embodiment, the bed platform 200 includes a lower portion 220 and an upper portion 210. The lower portion 220 includes a bottom and four sides to provide the interior storage volume. One edge of the upper portion 210 is rotationally attached to one of the sides of the lower portion 220 with hinges, or the like, such that the top portion 220 rotates around an axis defined by the upper edge of the one side of the lower portion 250. In one exemplary embodiment, the upper portion 220 may include one or more retention clips 240 configured to secure the mattress to the upper portion 220.

In one exemplary embodiment, there are six retention clips 240 spaced at various intervals and affixed to an underside of the upper portion 210. Each of the retention clips 240 are positioned proximate to an opening or passage within the upper portion 210 configured to receive a strap affixed to an underside of the mattress 230. In this example, six straps are attached to various points of the underside of the mattress 230, are passed through an opening to a corresponding retention clip 240. Thus, the exemplary configuration has the desired effect of providing six attachment points between mattress 230 and the upper portion 210 while avoiding the undesirable deformation of the mattress. In addition, the straps may be conveniently tightened and/or secured with the retention clips 240 by accessing the retention clips 240 from the underside of the upper portion 210 when the upper portion 210 is rotated to an open position where access is provided to the interior storage volume. In one exemplary embodiment, the retention clip 240 may be a threaded bore or a captive nut configured to receive a bolt and wherein the bolt is passed through a hole in one of the straps attached to the mattress 230. In an additional exemplary embodiment, a cushion is enclosed within a mattress bag to form the mattress 230.

Figure 3:
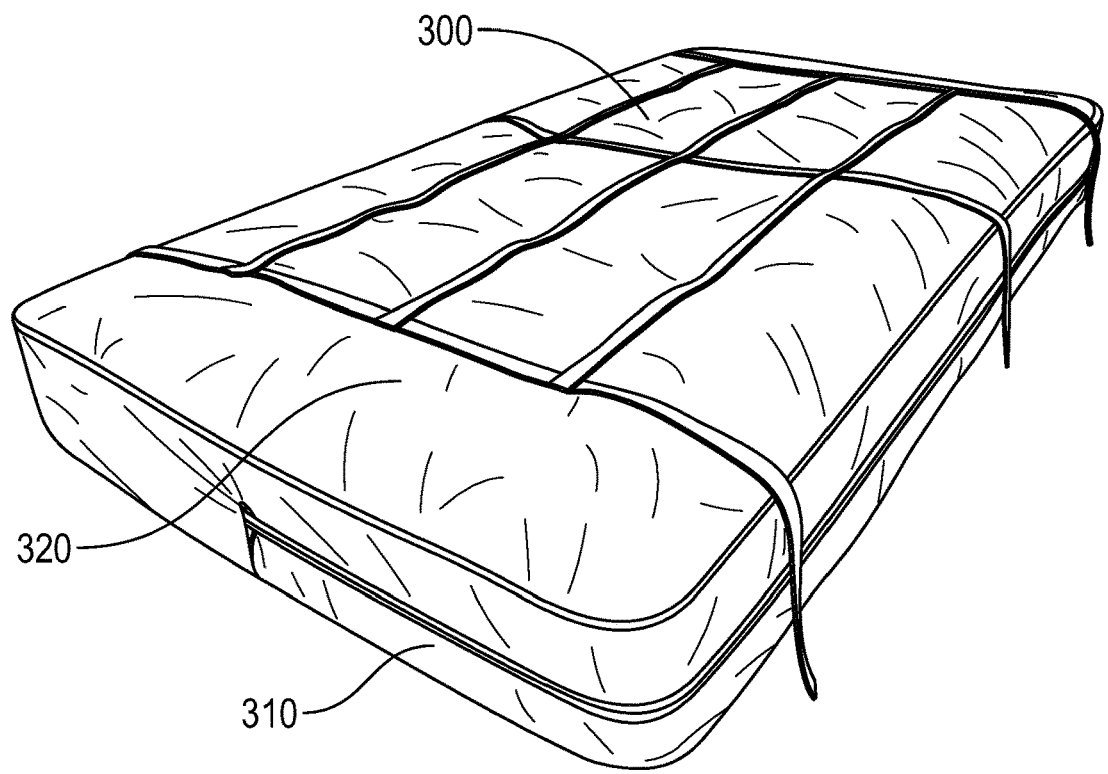
FIG. 3 is a perspective view illustrating a bottom view of an exemplary mattress bag according to an exemplary embodiment.

Turning now to FIG. 3, a bottom view of a mattress bag 300 according to an exemplary embodiment of the current disclosure is shown. The exemplary mattress bag 300 is configured to enclose a cushion or padding, such as a mattress or seat cushion. The mattress bag 300 may include a zipper 310 for allowing access to the interior of the mattress bag 300 to facilitate insertion of the cushion into the mattress bag 300. Closing the zipper 310 after insertion of the cushion into the mattress bag 300 facilitates the complete enclosure on the cushion within the mattress bag 300. In one exemplary embodiment, the zipper 310 is located within a side of the mattress bag 300 and extends beyond the side to a portion of each of the adjoining sides. In another embodiment, the zipper 310 may be positioned on an edge formed by the side and a top or bottom surface.

The exemplary mattress bag 300 further includes a strapping system 320 attached to the bottom of the mattress bag 300. The strapping system 320 may be affixed to the outside of the mattress bag 300 in such a way that portions of the strapping system 320 are aligned with retention clips in a corresponding bed support. Alternatively, the strapping system 320 may be affixed to an inner surface of the mattress bag 300 with portions of the strapping system passing through openings, such as slots, in the mattress bag 300 such that the portions of the strapping system 320 are aligned with retention clips in a corresponding bed support and may be engaged by the retention clips. The strapping system 320 may be affixed to the mattress bag 300 using stitching and/or adhesive. In this exemplary embodiment, the strapping system 320 is arranged such that three portions of the strapping system 320 extend from a first side of the mattress bag 300 and three additional portions of the strapping system 320 extend from a distal, or opposite, side of the mattress bag 300 such that when each of the extended portions are retained by retention clips, that the mattress bag 300 is fully secured and cannot be rotated from the bed support.

Figure 4:
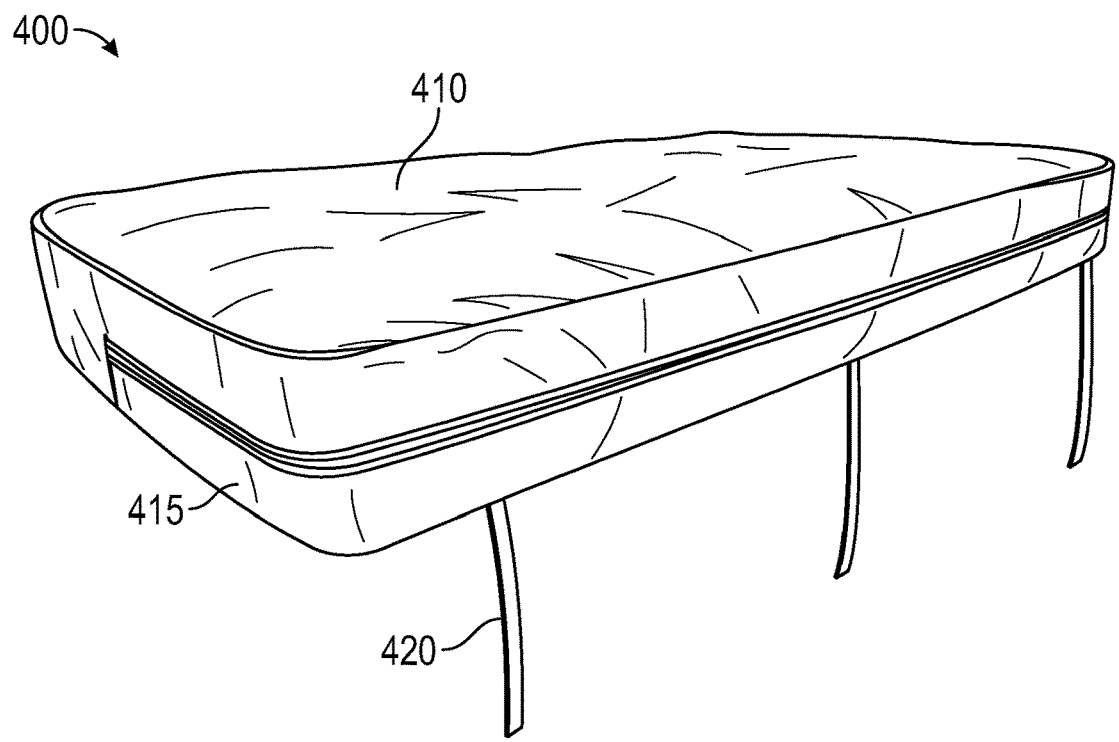
FIG. 4 is a perspective view illustrating a top view of an exemplary mattress bag according to another exemplary embodiment.

Turning now to FIG. 4, a top view of a mattress bag 400 according to an exemplary embodiment of the current disclosure is shown. The exemplary mattress bag 400 is configured to enclose a cushion or padding, such as a mattress or seat cushion. The mattress bag 400 may include a zipper 415 for allowing access to the interior of the mattress bag 400 to facilitate insertion of the cushion into the mattress bag 400. The exemplary mattress bag 400 may include an upper portion 410 having a softer fabric that the other portions of the mattress bag 400. For example, the bottom portion and side portions of the mattress bag 400 may be constructed of poly carbonate or ripstop nylon wherein the upper portion 410 may be constructed of a weaved cotton. In one exemplary embodiment, a softer fabric, such as weaved cotton, may be affixed over a less soft fabric, such as a polycarbonate or rip stop nylon, to form the upper portion 410 such that the primary seating or contact surface is more comfortable to an aircraft occupant.

The exemplary mattress bag 400 further includes a strapping system 420 configured to secure the mattress bag 400 to a bed support structure or the like. The strapping system 420 may be secured to bottom of the mattress bag 400 such that portions of the strapping system extend from the mattress bag 400 to be inserted into retention clips or the like on the bed support structure. The mattress bag 400 may further include a zippered opening 415 on a portion of the mattress bag 400, such as a side of the mattress bag 400, so that a mattress, cushion, or other padded object or material may be inserted into the mattress bag 400 to provide a padded sleeping surface for an aircraft occupant. When closed, the zippered opening 415 is operative to secure the mattress within the mattress bag 400 during aircraft operation.

Figure 5A:
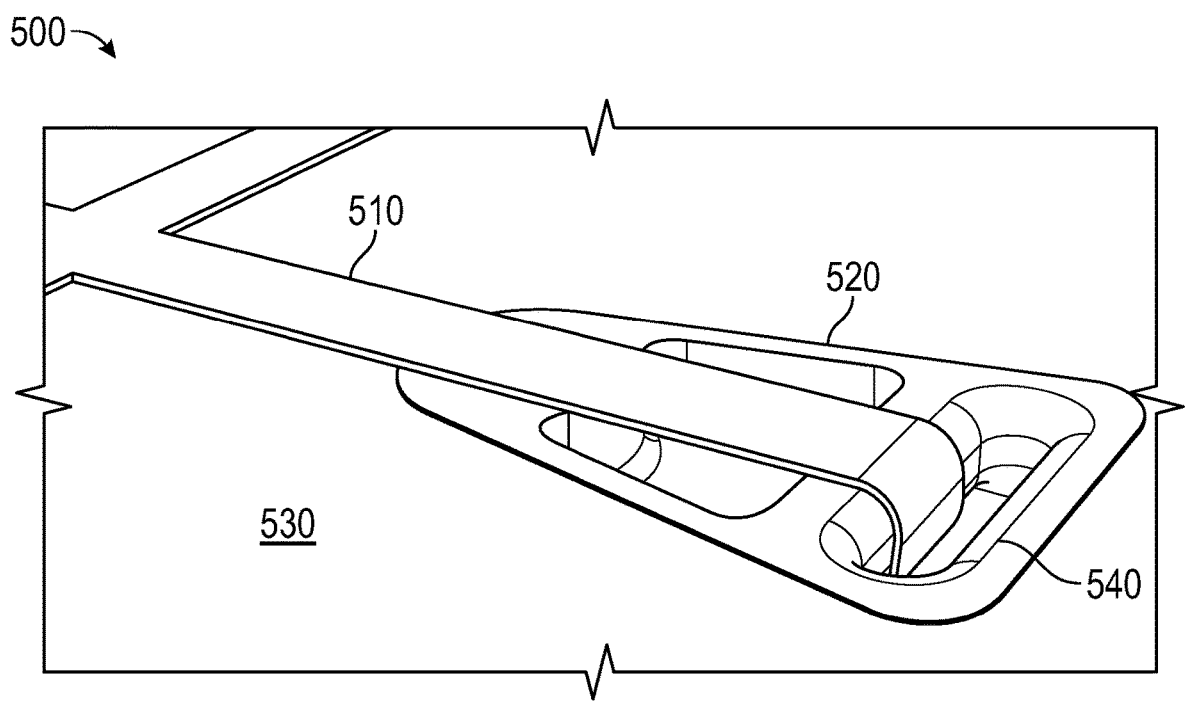
FIG. 5a is a perspective view illustrating an exterior view of an exemplary implementation of a retention clip for providing a mattress retention system in an aircraft passenger compartment according to another exemplary embodiment.

Turning now to FIG. 5a, an exterior view 500 of an exemplary implementation of a retention clip 520 for providing a mattress retention system in an aircraft passenger compartment is shown. In this exemplary embodiment, the retention clip 520 is shown from an exterior view of an upper portion 530 of a bed support. The strapping system 510 is affixed to a bottom surface of a mattress bag (not shown) for securing a mattress in an aircraft occupant compartment. At least one portion of the strapping system 510 is extended from the mattress bag through an opening 540 within the retention clip 520 to be passed through the upper portion 530 of the bed support.

Figure 5B:
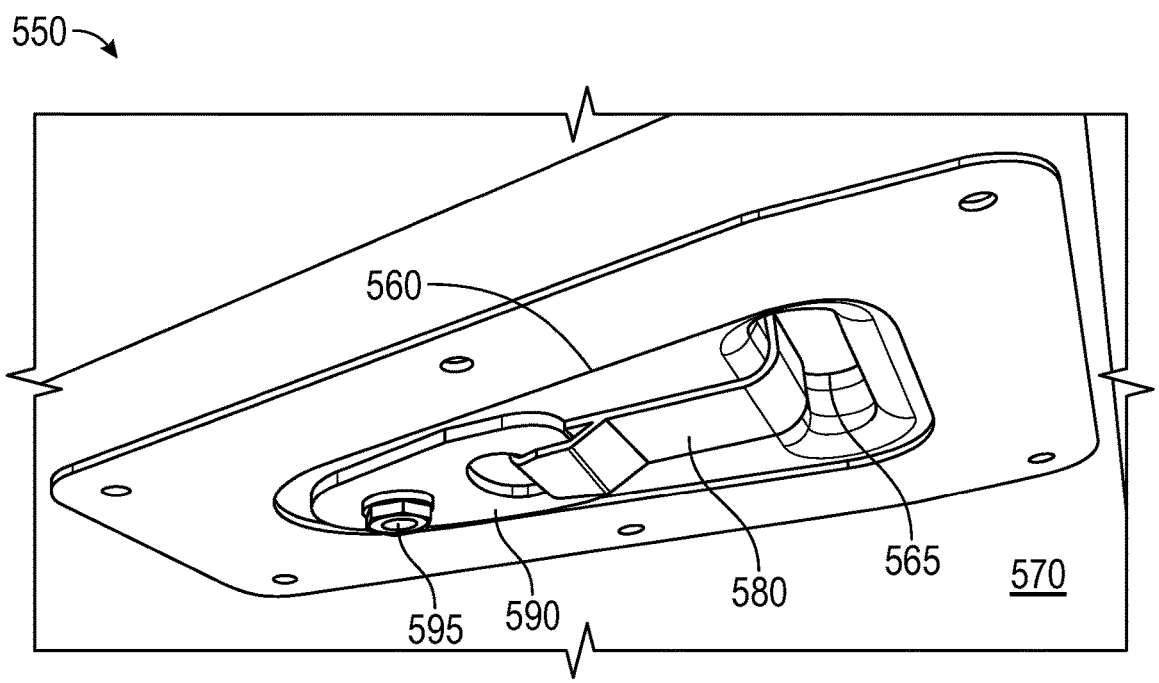
FIG. 5b is a perspective view illustrating an interior view of an exemplary implementation of a retention clip for providing a mattress retention system in an aircraft passenger compartment according to another exemplary embodiment.

Turning now to FIG. 5b, an interior view of an exemplary implementation of a retention clip 510 for providing a mattress retention system in an aircraft passenger compartment is shown. In this exemplary embodiment, the retention clip 560 is shown from an interior view of an upper portion 570 of a bed support. An extension of the strapping system 580 is shown being extended from a mattress bag (not shown) through an opening 565 within the retention clip 560 allowing the extension of the strapping system 580 to be secured to the upper portion 570 of the bed support from an interior of the bed support. In this exemplary embodiment, the extension of the strapping system 580 is attached to a buckle 590 having a first opening for the extension of the strapping system 580 and a second opening for allowing a bolt 595 to be passed through. The bolt 595 may be engaged in a threaded bore (not shown) or captive nut integral to the retention clip 560.

Figure 6:
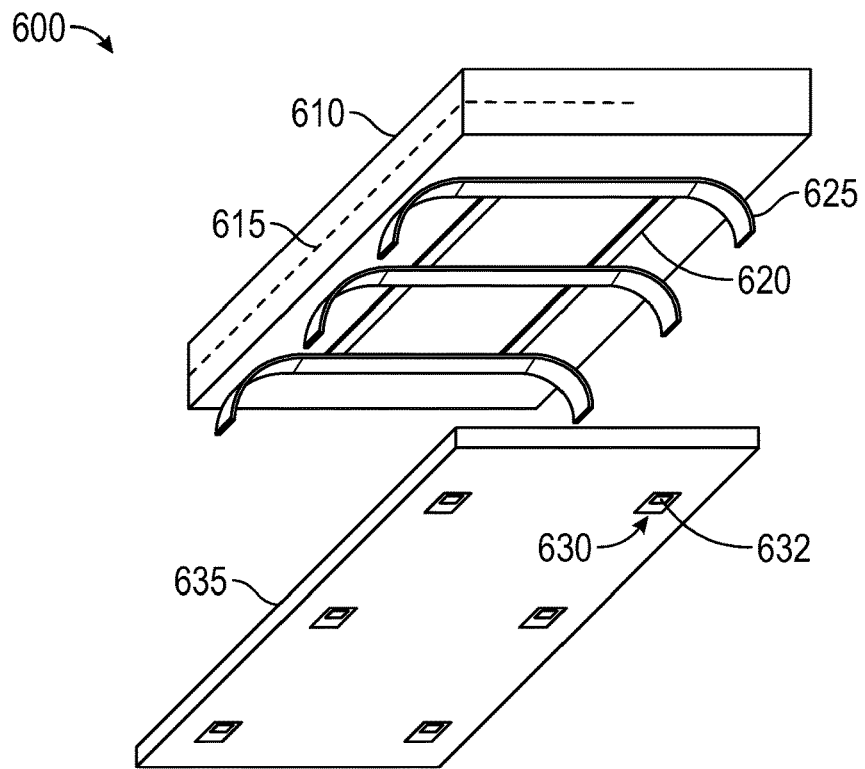
FIG. 6 is a schematic perspective view illustrating an exemplary mattress retention system according to another exemplary embodiment.

Turning now to FIG. 6, an exemplary mattress retention system 600 according to an exemplary embodiment of the present disclosure is shown. The exemplary system 600 may include a pliable enclosure 610 and a strapping system 620.

The pliable enclosure 610, such as a mattress bag or mattress cover, may be configured for enclosing a mattress. The mattress is enclosed within the pliable enclosure 610 to restrict movement of the mattress within an aircraft occupant compartment during operation of the aircraft. The pliable enclosure 610 may include a fastener system 615 for providing access to an interior of the pliable enclosure when the fastener system 615 is in an open state, and for restraining the mattress when the fastener system 615 is in a closed state. In one exemplary embodiment, the fastener system 615 is a zipper running a length of the pliable enclosure 610. In another exemplary embodiment, the fastener system 615 is a plurality of snaps or hooks and eyelets. The pliable enclosure 610 has a top surface and a bottom surface where, in one exemplary embodiment, the top surface is constructed of a softer fabric than the bottom surface such that the softer fabric is facing up when the pliable enclosure 610 is affixed to a bed support. In another exemplary embodiment, a layer of the softer fabric may be installed over a layer of coarser fabric to provide a padding for an occupant from the coarser fabric.

The exemplary mattress retention system 600 may further include a strapping system 620 affixed to the bottom surface of the pliable enclosure 610. The strapping system 620 may include at least one strap extension 625 affixed to the strapping system 620 for securing the pliable enclosure 610 to a bed support platform. The strap extension 625 may be configured to be received by at least one retention clip 630 secured to the bed support platform. The retention clip 630 may further be configured to pass the strap extension from an exterior of the bed support platform through a retention clip opening 632 to an interior of the bed support platform. In one embodiment, the strap extension 625 is secured by the retention clip 630 within the interior of the bed support platform. In an exemplary embodiment, the interior of the bed support platform 635 may be accessible by rotating a top portion 635 of the bed support platform around a hinged coupling to a bottom portion of the bed support platform In one example, the strap extension 625 is secured by a bolt in a threaded bore integral to the retention clip within the interior of the bed support platform. In an alternate embodiment, the strap extension 625 is secured by a spring buckle integral to the retention clip 630 within the interior of the bed support platform. In addition, the strapping system 620 may include a plurality of strap extensions 625, such as six strap extensions 625, wherein each of the plurality of strap extensions 625 is configured to be secured to one of a plurality of retention clips 630. In an exemplary embodiment, the strapping system 620 may include one strap, such as one wide strap, affixed to the bottom surface of the pliable enclosure wherein the one strap is secured by a single retention clip.

Figure 7:
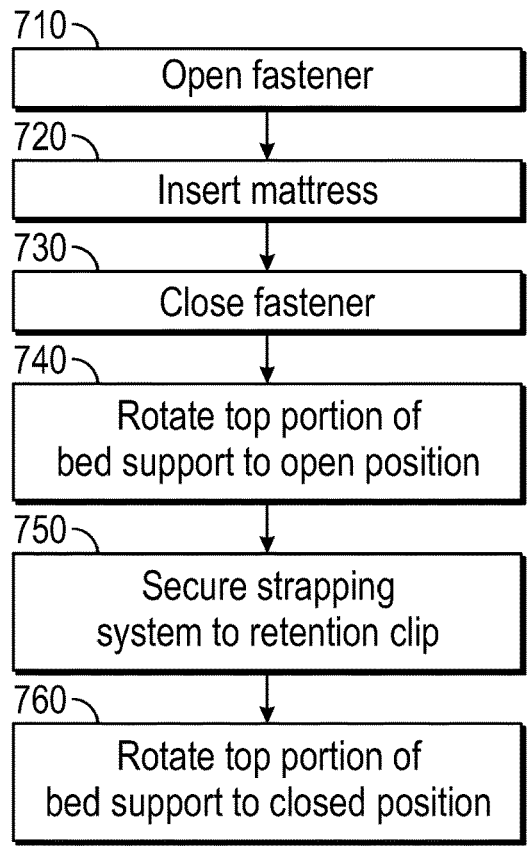
FIG. 7 a flow chart illustrating a method for securing a mattress within an aircraft passenger compartment according to an exemplary embodiment.

Turning now to FIG. 7, a flow chart illustrating an exemplary method 700 for securing a mattress within an aircraft passenger compartment according to an exemplary embodiment of the present disclosure is shown. The pliable enclosure is configured for enclosing the mattress within an aircraft passenger compartment during aircraft operation. The exemplary method 700 may employ a pliable enclosure configured for enclosing the mattress having a fastener system, for providing access to an interior of the pliable enclosure when the fastener is in an open state, and for restraining the mattress when the closure is in a closed state. The pliable enclosure may have a top surface and a bottom surface and a strapping system affixed to the bottom surface wherein the strapping system includes a strap extension affixed to the strapping system and wherein the strap extension is configured to be received by a retention clip secured to a bed support platform.

In order to secure the mattress for aircraft operations, the method is first operative for opening 710 the pliable enclosure by manipulating the fastener such that it is in the open state. For example, a zipper running along one or more sides of the pliable enclosure may be unzipped to provide access to the interior of the pliable enclosure. The mattress is then inserted 720 within the pliable enclosure. In this example, the pliable enclosure should have continuous fabric sides such that a smooth surface is provided when the mattress is enclosed for passenger comfort.

The method is next operative to close 730 the pliable enclosure by manipulating the fastener such that it is in the closed state. If the fastener is a zipper, the zipper may be zipped to the closed position such that the interior of the pliable enclosure is no longer accessible and that the mattress is restrained within the pliable enclosure.

The method is next operative for rotating 740 a top portion of the bed support platform around a hinged coupled to a bottom portion of the bed support platform wherein the retention clip is located within an interior of the bed platform. For example, the top portion of the bed support platform may be configured to provide access to a storage volume within the bed support wherein the lower bottom portion of the bed support platform has five sides configured to form the storage volume and the upper portion of the bed support platform forms the sixth side to enclose the storage volume.

The method is next operative for securing 750 the strapping system to the retention clip. In one exemplary embodiment, the strap extension is secured by a bolt in a threaded bore integral to the retention clip within the interior of the bed support platform. In an alternate embodiment, strap extension is secured by a spring buckle integral to the retention clip within the interior of the bed support platform. In another exemplary embodiment, the retention clip may be configured to pass the strap extension from an exterior of the bed support platform through a retention clip opening to an interior of the bed support platform and wherein the strap extension is secured by the retention clip within the interior of the bed support platform The strapping system may include a plurality of strap extensions wherein each of the plurality of strap extensions is configured to be secured to one of a plurality of retention clips.

Finally, the method is operative for rotating 760 the top portion of the bed support platform around a hinged coupling to a bottom portion of the bed support platform wherein the retention clip is located within an interior of the bed platform. Then the top portion is rotated to the closed position, the interior storage volume of the bed support platform may be securely enclosed, thereby securing any object within the interior storage volume. In addition, the retention clips and corresponding extension straps are hidden from view when the top portion is rotated into the closed position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a pliable enclosure configured for enclosing a cushion including a fastener system for providing access to an interior of the pliable enclosure when the fastener system is in an open state and for restraining the cushion when the fastener system is in a closed state and wherein the pliable enclosure has a top surface and a bottom surface; and
   a strapping system affixed to the bottom surface wherein the strapping system includes a strap extension affixed to the strapping system wherein the strap extension is configured to pass from an exterior of a bed support platform through a retention clip opening to an interior of the bed support platform to be received by a retention clip secured to an interior of the bed support platform.

2. The apparatus of claim 1 including the bed support platform, wherein the bed support platform is rigidly affixed to an aircraft seat track.

3. The apparatus of claim 1 wherein the strapping system includes a plurality of strap extensions wherein each of the plurality of strap extensions is configured to be secured to one of a plurality of retention clips.

4. The apparatus of claim 1 including the bed support platform, wherein the interior of the bed support platform is accessible by rotating a top portion of the bed support platform around a hinged coupling to a bottom portion of the bed support platform.

5. The apparatus of claim 1 including the retention clip, wherein the strap extension is secured by a bolt in a threaded bore integral to the retention clip.

6. The apparatus of claim 1 including the retention clip, wherein the strap extension is secured by a spring buckle integral to the retention clip.

7. The apparatus of claim 1 wherein the fastener system is a zipper.

8. The apparatus of claim 1 the top surface is constructed of a softer fabric than the bottom surface.

9. A method for securing a mattress within an aircraft passenger compartment comprising:
   opening a pliable enclosure by manipulating a fastener such that it is in an open state wherein the pliable enclosure is configured for enclosing the mattress having the fastener for providing access to an interior of the pliable enclosure when the fastener is in the open state and for restraining the mattress when the fastener is in a closed state, wherein the pliable enclosure has a top surface and a bottom surface and a strapping system affixed to the bottom surface wherein the strapping system includes a strap extension affixed to the strapping system and wherein the strap extension is configured to pass from an exterior of a bed support platform through a retention clip opening to an interior of the bed support platform to be received by a retention clip secured to an interior of the bed support platform;
   inserting the mattress within the pliable enclosure;
   closing the pliable enclosure by manipulating the fastener such that it is in the closed state; and
   securing the strapping system to the retention clip.

10. The method of claim 9 wherein the top surface is constructed of a softer fabric than the bottom surface.

11. The method of claim 9 wherein the strapping system includes a plurality of strap extensions wherein each of the plurality of strap extensions is configured to be secured to one of a plurality of retention clips.

12. The method of claim 9 wherein the pliable enclosure is configured for enclosing the mattress within the aircraft passenger compartment.

13. The method of claim 9 including the retention clip wherein the strap extension is secured by a spring buckle integral to the retention clip within the interior of the bed support platform.

14. The method of claim 9 wherein the strapping system includes a plurality of strap extensions wherein each of the plurality of strap extensions is configured to be secured to one of a plurality of retention clips.

15. The method of claim 9 further including rotating a top portion of the bed support platform around a hinged coupling to a bottom portion of the bed support platform to provide access to an interior portion of the bed support platform wherein the retention clip is located within the interior of the bed support platform.

16. The method of claim 9 including the retention clip wherein the strap extension is secured by a bolt in a threaded bore integral to the retention clip within the interior of the bed support platform.

17. An apparatus for securing a mattress to a bed support platform within an aircraft occupant compartment comprising:

An enclosure configured to enclose the mattress including a fastener system for providing access to an interior of the enclosure when the fastener system is in an open state and for restraining the mattress when the fastener system is in a closed state, wherein the enclosure has a top surface and a bottom surface;

a strapping system affixed to the bottom surface wherein the strapping system includes a strap extension affixed to the strapping system and wherein the strap extension is configured to pass from an exterior of the bed support platform through a retention clip opening to an interior of the bed support platform; and a retention clip secured to the interior of the bed support platform configured to receive the strap extension.

18. The apparatus for securing the mattress to the bed support platform within the aircraft occupant compartment of claim 17 wherein the retention clip is accessed from the interior of the bed support platform.

\* \* \* \* \*